United States Patent [19]

Tegtmeier et al.

[11] 4,245,981

[45] Jan. 20, 1981

[54] SHAFT TYPE COUNTERCURRENT HEAT EXCHANGER

[75] Inventors: Gert Tegtmeier, Oelde; Wolf Goldmann, Beckum; Wolfgang Triebel, Oelde, all of Fed. Rep. of Germany

[73] Assignee: Polysius AG, Beckum, Fed. Rep. of Germany

[21] Appl. No.: 39,276

[22] Filed: May 16, 1979

[30] Foreign Application Priority Data

May 22, 1978 [DE] Fed. Rep. of Germany ....... 2822215

[51] Int. Cl.³ ............................ F27B 7/32; F27B 7/02
[52] U.S. Cl. ...................................... 432/58; 432/14; 432/106
[58] Field of Search ...................... 432/58, 106, 14; 34/57 A, 57 E; 106/100

[56] References Cited

U.S. PATENT DOCUMENTS

| | | | |
|---|---|---|---|
| 3,145,094 | 8/1964 | Nakajima | 432/58 |
| 3,664,650 | 5/1972 | Weber et al. | 432/58 |
| 3,752,455 | 8/1973 | Zacpal et al. | 432/58 |
| 4,035,139 | 7/1977 | Goldmann et al. | 432/106 |
| 4,060,375 | 11/1977 | Weber et al. | 432/106 |
| 4,083,676 | 4/1978 | Ritzmann et al. | 432/14 |
| 4,096,642 | 6/1978 | Triebel | 432/106 |

Primary Examiner—Henry C. Yuen
Attorney, Agent, or Firm—Learman & McCulloch

[57] ABSTRACT

The invention relates to a shaft-type countercurrent heat exchanger in which the uppermost part of the shaft is formed by a turbulence chamber which communicates with the underlying countercurrent chamber of the shaft through a central material outlet and several gas pipes opening tangentially into the turbulence chamber, thereby improving the thermal efficiency of the heat exchanger.

7 Claims, 3 Drawing Figures

SHAFT TYPE COUNTERCURRENT HEAT EXCHANGER

BACKGROUND OF THE INVENTION

This invention relates to a shaft-type countercurrent heat exchanger for the heat treatment of finegrained material with hot gas which flows upward through the heat exchanger countercurrent to the material. The heat exchanger comprises several vertically adjacent countercurrent chambers which are separated from one another by funnel-like reductions in the cross-section of the shaft and at least two cyclones connected in parallel at the upper end of the shaft.

A shaft-type countercurrent heat exchanger of the kind mentioned above is known for example from Zement-Kalk-Gips, 1965, page 628 (FIG. 9). It consists of four vertically adjacent countercurrent chambers and of two cyclones connected in parallel in the uppermost stage and is distinguished primarily by its simple construction and compactness.

The object of the present invention is to develop further the known countercurrent heat exchanger to the extent that its efficiency level, i.e., the transfer of heat from the hot gas to the fine-grained material, is improved.

SUMMARY OF THE INVENTION

According to the invention, this object is achieved in that the uppermost part of the shaft situated below the cyclones is formed by a turbulence chamber which communicates with the underlying countercurrent chamber of the shaft through a central material outlet and several peripherally distributed gas pipes opening tangentially into the turbulence chamber.

By virtue of the fact that, according to the invention, the uppermost countercurrent chamber of the known shaft-type countercurrent heat exchanger is replaced by a turbulence chamber, the deposition level in this stage is considerably improved and, hence, the circulation of material between the cyclone stage and the uppermost stage of the shaft is reduced. As a result, the thermal efficiency and, hence, the operating economy of the heat exchanger are considerably improved.

Since the self-supporting structure of the shafttype heat exchanger is not adversely affected by the construction of the uppermost stage of the shaft according to the invention as a turbulence chamber, the basic advantages of the known heat exchanger remain intact, in addition to which it is possible to modify already existing installations without difficulty.

BRIEF DESCRIPTION OF THE DRAWINGS

Further features of the invention are explained in more detail in the following description of preferred embodiments illustrated in the accompanying drawings, wherein.

Figure 1:
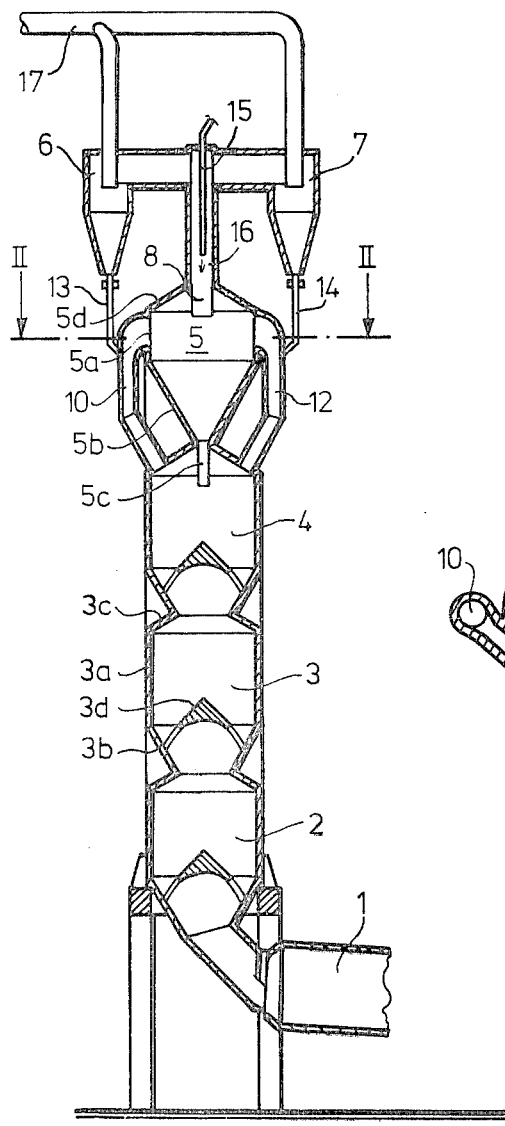
FIG. 1 is a vertical section through a countercurrent heat exchanger according to one embodiment of the invention.

A shaft-type countercurrent heat exchanger of the kind illustrated in the drawings is used, for example, as a preheater for preheating fine-grained material, such as raw cement mix, before it is delivered to a following calcination stage, for example, a revolving tubular kiln 1.

Figure 2:
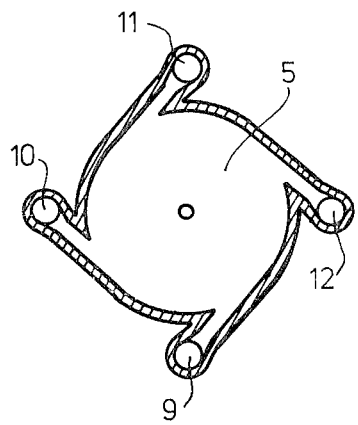
FIG. 2 is a horizontal section through the turbulence stage of the heat exchanger and taken on the line II—II of FIG. 1.

The countercurrent heat exchanger shown in FIGS. 1 and 2 consists essentially of a shaft comprising three countercurrent chambers 2, 3, 4. At the upper end of the shaft is a turbulence chamber 5 in communication with two cyclones 6 and 7 connected in parallel.

The countercurrent chambers 2, 3, and 4 each consist of a cylindrical main section (for example 3a), a funnel-like reduction in cross-section (for example 3b) at the lower end and a cover wall (for example 3c) which extends frustoconically inward. In addition, the countercurrent chambers are provided with internal fittings (for example 3d) above the funnel-like reduction in their cross-section.

The turbulence chamber 5 consists essentially of a cylindrical main section 5a which forms part of the supporting shaft construction, of a funnel 5b which adjoins the cylindrical main section 5a at its lower end and opens into the countercurrent chamber 4 through a dip pipe 5c, and a cover wall 5d which extends conically inward. A dip pipe 8 connects the turbulence chamber 5 to th four overlying cyclones (for example 6, 7) and projects inward through the cover wall 5d.

The turbulence chamber 5 communicates with the countercurrent chamber 4 through the central material outlet formed by the dip pipe 5c and through four peripherally distributed gas pipes 9, 10, 11 and 12 which open tangentially into the turbulence chamber 5. These gas pipes 9-12 extend outward from the frustoconical cover wall of the countercurrent chamber 4 through the supporting mantle of the shaft and tangentially adjoin the turbulence chamber 5 at the level of its cylindrical mainsection 5a.

The material discharge pipes 13, 14 of the cyclones (for example 6, 7) open into the gas pipes 9-12, and preferably into the horizontal flow section thereof. Where only two cylcones 6 and 7 are used in the uppermost stage, only tow gas pipes are correspondingly provided for the turbulence chamber 5 or, alternatively, the material discharge pipes 13, 14 are branched. It is of course also possible to provide four cyclones in the uppermost stage of which the material discharge pipes are respectively associated with the gas lines 9-12.

The mode of operation of the countercurrent heat exchanger according to the invention although largely self-explanatory is as follows:

The raw material to be heat treated is introduced through a pipe 15 into the gas pipe 16 which adjoins the dip pipe 8 and which leads to the two cyclones 6 and 7. The material passes with the hot gas stream into the cyclones (for example 6, 7) where it is deposited and delivered through the material discharge pipes 13 and 14 to the gas lines 9-12, whilst the waste gases from the cyclones 6 and 7 are removed through the pipe 17. The material introduced into the gas pipes 9-12 of the turbulence stage is tangentially introduced into the turbulence chamber 5 with the hot gas and is deposited in the turbulence chamber 5 by the sink generated by the tangential flow. The material passes through the dip pipe 5c into the countercurrent chamber 4 where it enters into renewed heat exchange with the hot gas flowing from the kiln 1 upward through the shaft. After deposition on the wall of the countercurrent chamber 4, the material passes through the reduction in the cross-section of the shaft into the next countercurrent chamber 3 and then into the lowermost countercurrent chamber 2 and, finally, enters the revolving tubular kiln 1 in highly preheated form.

Figure 3:
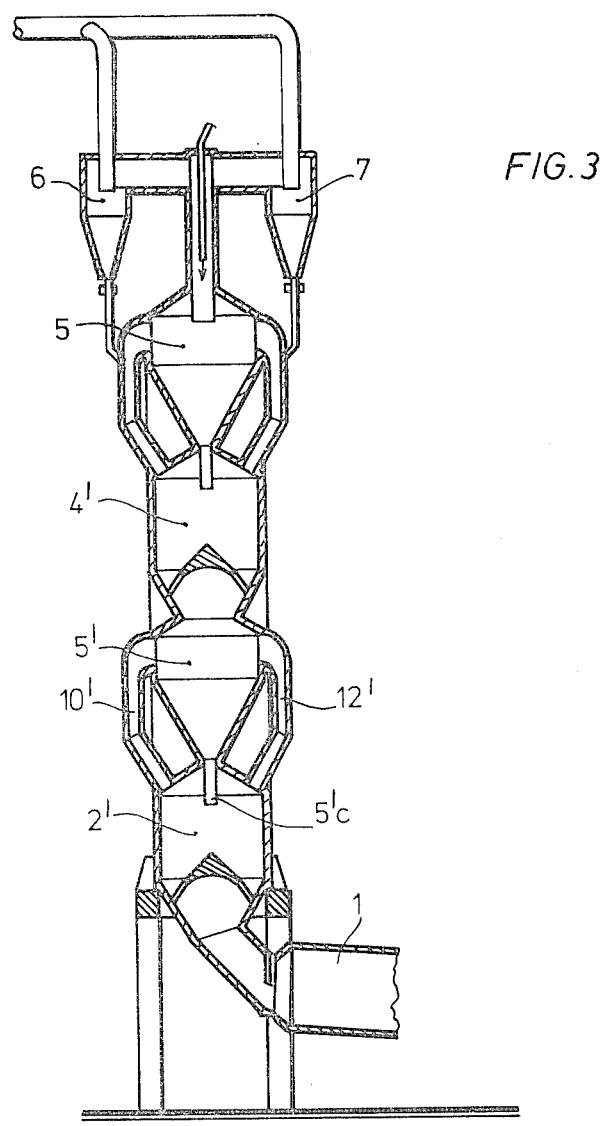
FIG. 3 is a vertical section through a second embodiment of the invention.

In the second embodiment shown in FIG. 3, a second turbulence chamber 5', arranged in the central region of the shaft between two countercurrent chambers 2', 4', is provided in addition to the turbulence chamber 5 forming the uppermost part of the shaft. This other turbulence chamber 5' communicates with the underlying countercurrent chamber 2' through a central material outlet 5'c and several peripherally distributed gas pipes corresponding to the number of pipes 9–12 and which open tangentially into the turbulence chamber (the pipes 10', 12' are visible in FIG. 3). In other respects, this second embodiment corresponds to the previously described first embodiment.

The disclosed embodiments are representative of presently preferred forms of the invention, but are intended to be illustrative rather than definitive thereof. The invention is defined in the claims.

We claim:

1. In a heat exchanger of the kind having a shaft composed of a plurality of vertically spaced, communicating countercurrent chambers to which fine grained raw material to be heat treated is delivered from a plurality of overhead cyclones to flow downwardly countercurrent to hot gases flowing constantly upwardly through each of the chambers of said shaft, each of said chambers having at its lower end a funnel-like reduction in cross-section, the improvement comprising means forming a turbulence chamber between said cyclones and the uppermost countercurrent chamber, said turbulence chamber having a material outlet in communication with said uppermost countercurrent chamber; a plurality of gas pipes extending between said uppermost countercurrent chamber and said turbulence chamber and opening tangentially into the latter for delivering hot gas to said turbulence chamber from said uppermost countercurrent chamber; and means communicating between said cyclones and said gas pipes for delivering raw material to be heat treated from said cyclones to said gas pipes, whereby raw material delivered to said gas pipes is entrained by gases flowing therethrough and is discharged into said turbulence chamber via said material outlet.

2. A heat exchanger according to claim 1 wherein the upper boundary of each individual countercurrent chamber of the shaft is formed by a cover wall extending frustoconically inward, and wherein said gas pipes connecting the uppermost countercurrent chamber to the turbulence chamber extend upwardly from the frustoconical cover wall.

3. A heat exchanger according to claim 1 wherein the uppermost countercurrent chamber communicates with the turbulence chamber through at least two gas pipes uniformly distributed over the periphery.

4. A heat exchanger according to claim 1 wherein said cyclones have material discharge pipes arranged above the turbulence chamber which open into the gas pipes connecting the uppermost countercurrent chamber to the turbulence chamber.

5. A heat exchanger according to claim 1 wherein the upper boundary of the turbulence chamber is formed by a frustoconical cover wall through which projects a dip pipe connecting the turbulence chamber to the overlying cyclones.

6. A heat exchanger according to claim 1 wherein the turbulence chamber comprises a cylindrical section forming part of the shaft, and a funnel which adjoins said cylindrical section at its lower end and which opens through a dip pipe into the underlying countercurrent chamber.

7. A heat exchanger according to claim 1 wherein, in addition to the turbulence chamber communicating with the uppermost countercurrent chamber, another turbulence chamber is provided between two other countercurrent chambers and communicates with the underlying countercurrent chamber through a central material outlet and several peripherally distributed gas pipes which open tangentially into the turbulence chamber.

* * * * *